(12) United States Patent
Yonezawa et al.

(10) Patent No.: US 11,460,747 B2
(45) Date of Patent: Oct. 4, 2022

(54) ELECTROCHROMIC LIGHT ADJUSTING MEMBER, LIGHT TRANSMITTING ELECTRICALLY CONDUCTIVE FILM, AND ELECTROCHROMIC LIGHT ADJUSTING ELEMENT

(71) Applicant: NITTO DENKO CORPORATION, Ibaraki (JP)

(72) Inventors: Hideyuki Yonezawa, Osaka (JP); Nozomi Fujino, Osaka (JP); Kenta Watanabe, Osaka (JP); Tomotake Nashiki, Osaka (JP)

(73) Assignee: NITTO DENKO CORPORATION, Ibaraki (JP)

( * ) Notice: Subject to any disclaimer, the term of this patent is extended or adjusted under 35 U.S.C. 154(b) by 427 days.

(21) Appl. No.: 16/089,465

(22) PCT Filed: Mar. 29, 2017

(86) PCT No.: PCT/JP2017/013038
§ 371 (c)(1),
(2) Date: Sep. 28, 2018

(87) PCT Pub. No.: WO2017/170757
PCT Pub. Date: Oct. 5, 2017

(65) Prior Publication Data
US 2020/0301225 A1    Sep. 24, 2020

(30) Foreign Application Priority Data

Apr. 1, 2016  (JP) .............. JP2016-074488
Mar. 28, 2017 (JP) .............. JP2017-063655

(51) Int. Cl.
*G02F 1/01* (2006.01)
*G02F 1/155* (2006.01)
*G02F 1/1343* (2006.01)

(52) U.S. Cl.
CPC .......... *G02F 1/155* (2013.01); *G02F 1/13439* (2013.01)

(58) Field of Classification Search
CPC .. G02F 1/157; G02F 1/163; G02F 2001/1635; G02F 1/155; G02F 1/13439
(Continued)

(56) References Cited

U.S. PATENT DOCUMENTS

| 7,978,393 B2 | 7/2011 | Tonar et al. |
| 2002/0048678 A1 | 4/2002 | Hunia et al. |

(Continued)

FOREIGN PATENT DOCUMENTS

| CN | 101421666 A | 4/2009 |
| CN | 101819007 A | 9/2010 |

(Continued)

OTHER PUBLICATIONS

Reference for Ω/□. Wiktionary (Year: 2020).*
(Continued)

*Primary Examiner* — Thomas K Pham
*Assistant Examiner* — Henry A Duong
(74) *Attorney, Agent, or Firm* — WHDA, LLP

(57) ABSTRACT

An electrochromic light adjusting member sequentially includes a transparent substrate, a light transmitting electrically conductive layer, and an electrochromic light adjusting layer. The light transmitting electrically conductive layer sequentially includes a first indium-based electrically conductive oxide layer, a metal layer, and a second indium-based electrically conductive oxide layer.

7 Claims, 6 Drawing Sheets

(58) Field of Classification Search
USPC .......................................................... 359/275
See application file for complete search history.

(56) References Cited

U.S. PATENT DOCUMENTS

| | | | |
|---|---|---|---|
| 2004/0191618 | A1 | 9/2004 | Morin et al. |
| 2004/0229049 | A1 | 11/2004 | Boire et al. |
| 2006/0245025 | A1 | 11/2006 | Tonar et al. |
| 2007/0206263 | A1* | 9/2007 | Neuman ................ B60R 1/088 359/267 |
| 2010/0127253 | A1 | 5/2010 | Inoue et al. |
| 2010/0182143 | A1 | 7/2010 | Lynam |
| 2011/0080629 | A1 | 4/2011 | Neuman et al. |
| 2012/0268961 | A1 | 10/2012 | Cammenga et al. |
| 2013/0286458 | A1 | 10/2013 | Lamine et al. |
| 2017/0081754 | A1 | 3/2017 | Hayakawa et al. |
| 2017/0139302 | A1* | 5/2017 | Tonar ..................... G02F 1/1533 |
| 2017/0331041 | A1* | 11/2017 | Hiraoka ................ H01L 51/56 |

FOREIGN PATENT DOCUMENTS

| | | | | |
|---|---|---|---|---|
| CN | 101833212 | A | | 9/2010 |
| CN | 102253559 | A | | 11/2011 |
| JP | 2002-520654 | A | | 7/2002 |
| JP | 2004-309926 | A | | 11/2004 |
| JP | 2006-004827 | A | | 1/2006 |
| JP | 2007-86771 | A | | 4/2007 |
| JP | 2008-70900 | A | | 3/2008 |
| JP | 2009-529151 | A | | 8/2009 |
| JP | 2014-526717 | A | | 10/2014 |
| JP | 2015-172666 | A | | 10/2015 |
| KR | 10-2008-0053489 | A | | 6/2008 |
| KR | 20150031917 | A | * | 3/2015 ............. B60R 1/088 |
| WO | 2006/062251 | A1 | | 6/2006 |
| WO | 2013/041562 | A1 | | 3/2013 |
| WO | 2014/164257 | A1 | | 10/2014 |
| WO | 2015/146292 | A | | 10/2015 |

OTHER PUBLICATIONS

"Spectral Reflectance Calculator for Thin-Film Stacks" by filmetrics. com https://www.filmetrics.com/reflectance-calculator (Year: 2021).*

Notification of Transmittal of Translation of the International Preliminary Report on Patentability (Form PCT/IB/338) issued in counterpart International Application No. PCT/JP2017/013038 dated Oct. 11, 2018, with Forms PCT/IB/373, PCT/IB/326 and PCT/ISA/237. (18 pages).

Extended Search Report dated Oct. 2, 2019, issued in counterpart EP Application No. 17775291.2 (8 pages).

Office Action dated Jun. 30, 2020, issued in counterpart JP application No. 2017-063655, with English translation. (6 pages).

Notice of Reason for Refusal dated Apr. 21, 2020, issued in counterpart JP Application No. 2017-063655, with English translation (9 pages).

International Search Report dated Jun. 20, 2017, issued in counterpart International Application No. PCT/JP2017/013038, with English Translation. (5 pages).

Office Action dated Sep. 28, 2020, issued in counterpart TW Application No. 106111003, with English translation. (11 pages).

Office Action dated Nov. 10, 2020, issued in counterpart JP Application No. 2017-063655, with English translation. (6 pages).

Office Action dated Feb. 1, 2021, issued in counterpart CN Application No. 201780022157.6, with English Translation. (16 pages).

Office Action dated Mar. 4, 2021, issued in counterpart EP Application No. 17775291.2. (5 pages).

Office Action dated Apr. 19, 2021, issued in counterpart KR application No. 10-2018-7026892, with English translation. (11 pages).

Office Action dated Jul. 14, 2021, issued in counterpart CN Application No. 201780022157.6, with English translation. (12 pages).

Office Action dated Nov. 26, 2021, issued in counterpart CN application No. 201780022157.6, with English translation. (13 pages).

Office Action dated Dec. 21, 2021, issued in counterpart KR application No. 10-2018-7026892, with English translation. (9 pages).

The Notice of Final Rejection dated Oct. 16, 2021, issued in counterpart KR Application No. 10-2018-7026892, with English Translation. (8 pages).

Decision of Rejection dated Mar. 31, 2022, issued in counterpart CN Application No. 201780022157.6, with English Translation. (16 pages).

* cited by examiner

Plane direction
(Right-left direction)

Plane direction
(Right-left direction)

ELECTROCHROMIC LIGHT ADJUSTING MEMBER, LIGHT TRANSMITTING ELECTRICALLY CONDUCTIVE FILM, AND ELECTROCHROMIC LIGHT ADJUSTING ELEMENT

TECHNICAL FIELD

The present invention relates to an electrochromic light adjusting member, a light transmitting electrically conductive film, and an electrochromic light adjusting element, to be specific, to an electrochromic light adjusting member, a light transmitting electrically conductive film used for the electrochromic light adjusting member, and an electrochromic light adjusting element including the electrochromic light adjusting member.

BACKGROUND ART

Conventionally, an electric current driven-type light adjusting device using an electrochromic material having a light transmission amount, a color, or the like changeable by an electrochemical oxidation reduction reaction has been known.

For example, an electrochromic element that includes a working electrode sheet, a counter electrode sheet, an electrochromic compound, and an electrolyte and in which the working electrode sheet includes a glass sheet and a transparent electrically conductive oxide film has been proposed (ref: for example, Patent Document 1). In the electrochromic element of Patent Document 1, as the transparent electrically conductive oxide film, a single layer made of a crystalline ITO film is used.

CITATION LIST

Patent Document

Patent Document 1: Japanese Unexamined Patent Publication No. 2015-172666

SUMMARY OF THE INVENTION

Problem to be Solved by the Invention

In the electrochromic element, in view of improvement of responsiveness of the electrochromic compound, energy conservation, or the like, it is required that a surface resistance value of an electrode substrate such as working electrode sheet is reduced (lowered resistance). As a method for the lowered resistance, a method for thickening a film thickness of the ITO film has been considered.

However, when the film thickness of the ITO film was thickened, a crack easily occurs when the electrode substrate is bent. There is a disadvantage that the electrochromic element is electric current driven, so that when the crack occurs in the electrode substrate, an oxidation reduction of the electrochromic compound in a crack portion is interrupted, and a light adjusting function is remarkably reduced. To be specific, for example, the uniformity at the time of coloration or decoloration is reduced, and color unevenness may occur.

An object of the present invention is to provide an electrochromic light adjusting member having excellent lowered resistance and excellent bending resistance, a light transmitting electrically conductive film, and an electrochromic light adjusting element.

Means for Solving the Problem

The present invention [1] includes an electrochromic light adjusting member sequentially including a transparent substrate, a light transmitting electrically conductive layer, and an electrochromic light adjusting layer, wherein the light transmitting electrically conductive layer sequentially includes a first indium-based electrically conductive oxide layer, a metal layer, and a second indium-based electrically conductive oxide layer.

The present invention [2] includes the electrochromic light adjusting member described in [1], wherein a surface resistance value of the light transmitting electrically conductive layer is 50Ω/□ or less.

The present invention [3] includes the electrochromic light adjusting member described in [1] or [2], wherein a near infrared ray average transmittance in 800 nm or more and 1500 nm or less of the light transmitting electrically conductive layer is 80% or less.

The present invention [4] includes the electrochromic light adjusting member described in any one of [1] to [3], wherein a near infrared ray average reflectance in 800 nm or more and 1500 nm or less of the light transmitting electrically conductive layer is 10% or more.

The present invention [5] includes the electrochromic light adjusting member described in any one of [1] to [4], wherein the light transmitting electrically conductive layer has a ratio ($R_1/R_0$) of a surface resistance value $R_1$ after bending thereof to an initial surface resistance value $R_0$ of 1.05 or less.

The present invention [6] includes the electrochromic light adjusting member described in any one of [1] to [5], wherein the transparent substrate is a flexible film.

The present invention [7] includes the electrochromic light adjusting member described in any one of [1] to [6], wherein both of the first indium-based electrically conductive oxide layer and the second indium-based electrically conductive oxide layer are an amorphous film.

The present invention [8] includes a light transmitting electrically conductive film for being used in the electrochromic light adjusting member described in any one of [1] to [7] sequentially including a transparent substrate and a light transmitting electrically conductive layer, wherein the light transmitting electrically conductive layer sequentially includes, from the transparent substrate, a first indium-based electrically conductive oxide layer, a metal layer, and a second indium-based electrically conductive oxide layer.

The present invention [9] includes an electrochromic light adjusting element including the electrochromic light adjusting member described in any one of [1] to [7] and an electrode substrate provided on the surface opposite to an electrochromic light adjusting layer with respect to the transparent substrate.

Effect of the Invention

According to the electrochromic light adjusting member, the light transmitting electrically conductive film, and the electrochromic light adjusting element of the present invention, the lowered resistance of the light transmitting electrically conductive layer is excellent, so that the responsiveness and the energy conservation of the electrochromic light adjusting layer are excellent. Also, the bending resistance of the light transmitting electrically conductive layer is excellent, so that when the light transmitting electrically conductive film is bent in a process of production or handling, an occurrence of a crack can be suppressed, and as a result, a reduction of a light adjusting function can be suppressed.

DESCRIPTION OF EMBODIMENTS

Figure 1:
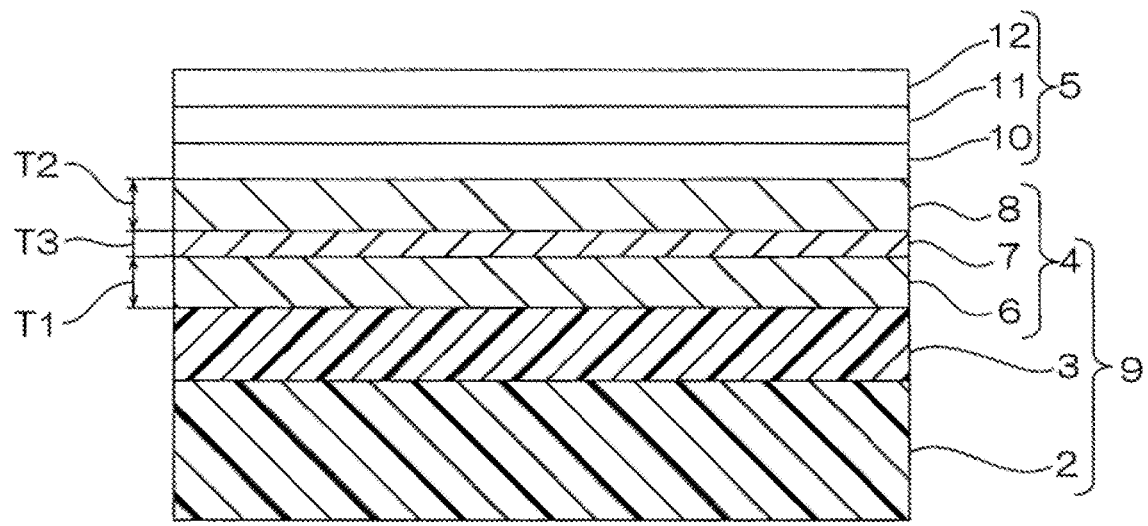
FIG. 1 shows a cross-sectional view of one embodiment of an electrochromic light adjusting member of the present invention.
Figure 1:
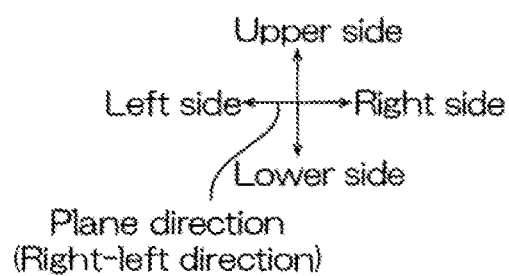

In FIG. 1, the up-down direction on the plane of the sheet is referred to as an up-down direction (thickness direction, first direction), the upper side on the plane of the sheet is referred to as an upper side (one side in the thickness direction, one side in the first direction), and the lower side on the plane of the sheet is referred to as a lower side (the other side in the thickness direction, the other side in the first direction). In FIG. 1, the right-left direction on the plane of the sheet is referred to as a right-left direction (width direction, second direction perpendicular to the first direction), the left side on the plane of the sheet is referred to as a left side (one side in the second direction), and the right side on the plane of the sheet is referred to as a right side (the other side in the second direction). In FIG. 1, the paper thickness direction is referred to as a front-rear direction (third direction perpendicular to the first and second directions), the near side on the plane of the sheet is referred to as a front side (one side in the third direction), and the far side on the plane of the sheet is referred to as a rear side (the other side in the third direction). To be specific, the directions are in conformity with direction arrows of each figure.

1. Electrochromic Light Adjusting Member

An electrochromic light adjusting member (hereinafter, also abbreviated as an EC light adjusting member) forms a film shape (including a sheet shape) having a predetermined thickness, extends in a predetermined direction perpendicular to the thickness direction (the front-rear direction and the right-left direction, that is, a plane direction), and has a flat upper surface and a flat lower surface (two main surfaces). The EC light adjusting member is, for example, one component of a light adjusting panel or the like provided in a light adjusting device, that is, not the light adjusting device.

That is, the EC light adjusting member is a component for fabricating a light adjusting device or the like, does not include a light source such as LED and an external power source, and is an industrially available device whose component alone can be circulated.

To be specific, as shown in FIG. 1, an EC light adjusting member 1 is a laminate film that sequentially includes a transparent substrate 2, a protecting layer 3, a light transmitting electrically conductive layer 4, and an electrochromic light adjusting layer 5 (hereinafter, also abbreviated as an EC light adjusting layer). That is, the EC light adjusting member 1 includes the transparent substrate 2, the protecting layer 3 that is disposed at the upper side of the transparent substrate 2, the light transmitting electrically conductive layer 4 that is disposed at the upper side of the protecting layer 3, and the EC light adjusting layer 5 that is disposed at the upper side of the light transmitting electrically conductive layer 4. Preferably, the EC light adjusting member 1 is made of only the transparent substrate 2, the protecting layer 3, the light transmitting electrically conductive layer 4, and the EC light adjusting layer 5. In the following, each of the layers is described in detail.

2. Transparent Substrate

The transparent substrate 2 is a part of an electrode substrate of the EC light adjusting member 1, the lowermost layer of the EC light adjusting member 1, and a supporting material that ensures the mechanical strength of the EC light adjusting member 1. The transparent substrate 2, along with the protecting layer 3, supports the light transmitting electrically conductive layer 4 and the EC light adjusting layer 5.

The transparent substrate 2 is, for example, made of a polymeric film.

The polymeric film has transparency and flexibility. Examples of a material of the polymeric film include polyester resins such as polyethylene terephthalate (PET), polybutylene terephthalate, and polyethylene naphthalate; (meth)acrylic resins (acrylic resin and/or methacrylic resin) such as polymethacrylate; olefin resins such as polyethylene, polypropylene, and cycloolefin polymer (COP); polycarbonate resin (PC); polyether sulfone resin; polyarylate resin; melamine resin; polyamide resin; polyimide resin; cellulose resin; polystyrene resin; and norbornene resin. These polymeric films can be used alone or in combination of two or more. In view of transparency, flexibility, heat resistance, and mechanical properties, preferably, a polyester resin, an olefin resin, and a PC are used, more preferably, a PET, a COP, and a PC are used.

The thickness of the transparent substrate 2 is, for example, 2 μm or more, preferably 20 μm or more, and for example, 300 μm or less, preferably 200 μm or less, more preferably 150 μm or less, further more preferably 80 μm or less. By setting the thickness of the transparent substrate 2 within the above-described range, the bending resistance and accordingly, the coloration uniformity of the EC light adjusting layer 5 can be furthermore excellent.

3. Protecting Layer

The protecting layer 3 is a part of the electrode substrate of the EC light adjusting member 1, and a scratch protecting layer for suppressing a scratch (that is, for obtaining excellent scratch resistance) on the upper surfaces of the light transmitting electrically conductive layer 4 and the EC light adjusting layer 5. The protecting layer 3 is also an optically adjusting layer that adjusts optical properties of the EC light adjusting member 1 so as to suppress visual recognition of a pattern, when the light transmitting electrically conductive layer 4 is formed into a pattern shape such as wiring pattern.

The protecting layer 3 has a film shape (including a sheet shape), and is disposed on the entire upper surface of the transparent substrate 2 so as to be in contact with the upper surface of the transparent substrate 2.

The protecting layer 3 is formed from a resin composition.

The resin composition contains, for example, a resin, particles, or the like. The resin composition preferably contains a resin, more preferably is made of only a resin.

Examples of the resin include curable resin and thermoplastic resin (for example, polyolefin resin). Preferably, a curable resin is used.

Examples of the curable resin include active energy ray curable resin that cures by application of an active energy ray (to be specific, ultraviolet ray, electron ray, or the like) and thermosetting resin that cures by heating. Preferably, an active energy ray curable resin is used.

An example of the active energy ray curable resin includes a polymer having a functional group having a polymerizable carbon-carbon double bonding in a molecule. Examples of the functional group include vinyl group and (meth)acryloyl group (methacryloyl group and/or acryloyl group).

An example of the active energy ray curable resin includes a (meth)acrylic resin (acrylic resin and/or methacrylic resin) having a functional group in a side chain.

These resins can be used alone or in combination of two or more.

Examples of the particles include inorganic particles and organic particles. Examples of the inorganic particles include silica particles, metal oxide particles made of zirconium oxide, titanium oxide, or the like, and carbonate particles such as calcium carbonate. Examples of the organic particles include cross-linking acrylic resin particles.

The thickness of the protecting layer 3 is, for example, 0.1 μm or more, preferably 1 μm or more, and for example, 10 μm or less, preferably 5 μm or less. The thickness of the protecting layer 3 is, for example, measured by cross-sectional observation with a transmission electron microscope (TEM).

4. Light Transmitting Electrically Conductive Layer

The light transmitting electrically conductive layer 4 is a part of the electrode substrate of the EC light adjusting member 1, and an electrically conductive layer for electrically conducting an electric current from an external power source (not shown) to the EC light adjusting layer 5. The light transmitting electrically conductive layer 4 is also a transparent electrically conductive layer.

As shown in FIG. 1, the light transmitting electrically conductive layer 4 has a film shape (including a sheet shape), and is disposed on the entire upper surface of the protecting layer 3 so as to be in contact with the upper surface of the protecting layer 3.

The light transmitting electrically conductive layer 4 sequentially includes a first indium-based electrically conductive oxide layer 6 (hereinafter, also abbreviated as a first oxide layer), a metal layer 7, and a second indium-based electrically conductive oxide layer 8 (hereinafter, also abbreviated as a second oxide layer) from the side of the transparent substrate 2. That is, the light transmitting electrically conductive layer 4 includes the first oxide layer 6 that is disposed on the protecting layer 3, the metal layer 7 that is disposed on the first oxide layer 6, and the second oxide layer 8 that is disposed on the metal layer 7. Preferably, the light transmitting electrically conductive layer 4 is made of only the first oxide layer 6, the metal layer 7, and the second oxide layer 8.

A surface resistance value (an initial surface resistance value $R_0$ and a surface resistance value $R_1$ after being bent) of the light transmitting electrically conductive layer 4 is, for example, 50Ω/□ or less, preferably 30Ω/□ or less, more preferably 20Ω/□ or less, further more preferably 15Ω/□ or less, and for example, 0.1Ω/□ or more, preferably 1Ω/□ or more, more preferably 5Ω/□ or more.

A ratio ($R_1/R_0$) of the surface resistance value $R_1$ after bending the light transmitting electrically conductive layer 4 to the initial surface resistance value $R_0$ of the light transmitting electrically conductive layer 4 is, for example, 1.05 or less, preferably 1.02 or less, more preferably 1.00 or less, and for example, 0.95 or more. By setting the above-described ratio within the above-described range, the bending resistance is excellent, and an increase in the surface resistance value by bending can be suppressed.

Figure 6:
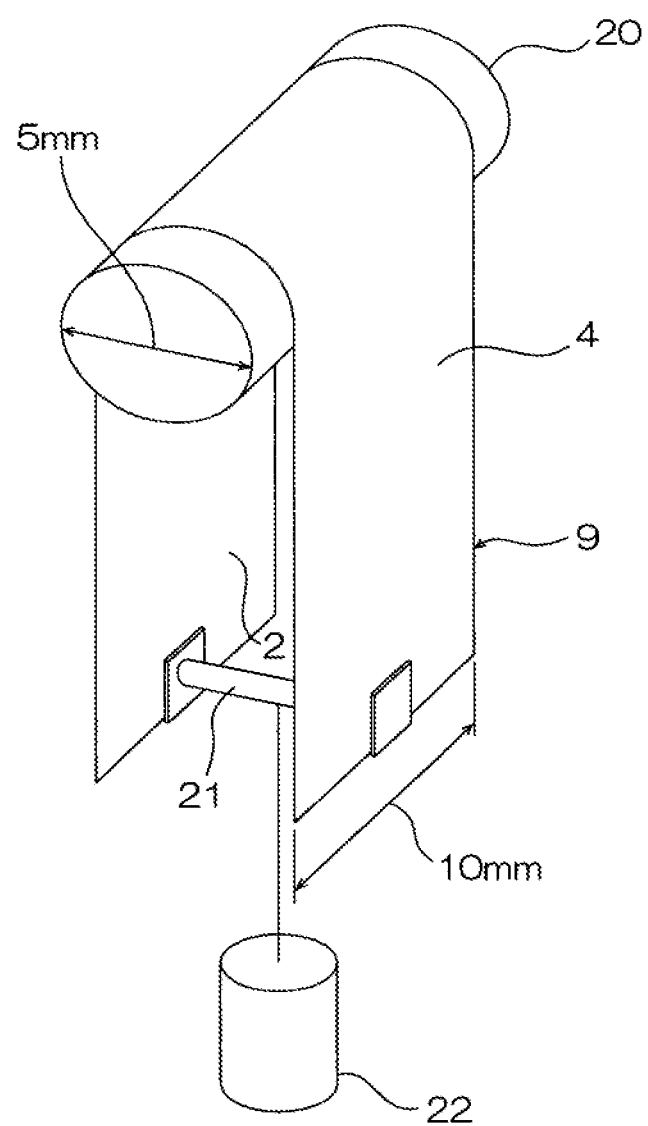
FIG. 6 shows a schematic perspective view of a test measuring bending resistance of the light transmitting electrically conductive film.

The light transmitting electrically conductive layer 4 after being bent is, as shown in FIG. 6, the light transmitting electrically conductive layer 4 of a light transmitting electrically conductive film 9 obtained by disposing the light transmitting electrically conductive film 9 to be described later on a mandrel having a diameter of 5 mm in a state of the light transmitting electrically conductive layer 4 at the outer side and applying a load of 50 g/mm downwardly with respect to the width of the light transmitting electrically conductive film 9 to be bent.

The surface resistance value of the light transmitting electrically conductive layer 4 with respect to the surface of the light transmitting electrically conductive layer 4 of the light transmitting electrically conductive film 9 is, for example, obtained by measurement in conformity with a four point probe method of JIS K 7194 (in 1994).

The specific resistance of the light transmitting electrically conductive layer 4 is, for example, $2.5 \times 10^{-4}$ Ω·cm or less, preferably $2.0 \times 10^{-4}$ Ω·cm or less, more preferably $1.1 \times 10^{-4}$ Ω·cm or less, and for example, $0.01 \times 10^{-4}$ Ω·cm or more, preferably $0.1 \times 10^{-4}$ Ω·cm or more, more preferably $0.5 \times 10^{-4}$ Ω·cm or more.

The specific resistance of the light transmitting electrically conductive layer 4 is calculated by using the thickness of the light transmitting electrically conductive layer 4 (the total thickness of the first oxide layer 6, the metal layer 7, and the second oxide layer 8) and the surface resistance value of the light transmitting electrically conductive layer 4.

The thickness of the light transmitting electrically conductive layer 4, that is, the total thickness of the first oxide layer 6, the metal layer 7, and the second oxide layer 8 is, for example, 20 nm or more, preferably 40 nm or more, more preferably 60 nm or more, further more preferably 80 nm or more, and for example, 150 nm or less, preferably 120 nm or less, more preferably 100 nm or less.

5. First Indium-Based Electrically Conductive Oxide Layer

The first oxide layer 6, along with the metal layer 7 and the second oxide layer 8 to be described later, is an electrically conductive layer that imparts electrically conductive properties to the light transmitting electrically conductive layer 4. The first oxide layer 6, along with the second oxide layer 8 to be described later, is also an optically adjusting layer for suppressing the visible ray reflectance of the metal layer 7, and improving the visible ray transmittance of the light transmitting electrically conductive layer 4.

The first oxide layer 6 is the lowermost layer of the light transmitting electrically conductive layer 4, has a film shape (including a sheet shape), and is disposed on the entire upper surface of the protecting layer 3 so as to be in contact with the upper surface of the protecting layer 3.

The first oxide layer 6 contains an indium oxide ($In_2O_3$). At least one kind of metal atom selected from the group consisting of Sn, Zn, Ga, Sb, Ti, Si, Zr, Mg, Al, Au, Ag, Cu, Pd, and W may be doped with the first oxide layer 6.

An electrically conductive oxide that forms the first oxide layer 6 (indium-based electrically conductive oxide) may contain only indium (In) as a metal element, or may contain a (semi)metal element other than the indium (In). A main metal element is preferably the indium (In). The electrically conductive oxide in which the main metal element is the indium has excellent barrier properties or the like.

By containing a single or a plurality of (semi)metal elements as an impurity element, the electrically conductive oxide can furthermore improve electrically conductive properties, transparency, and bending resistance. The ratio of the number of atoms contained in the impurity metal element to the number of atoms of the main metal element In in the first oxide layer 6 (number of atoms of impurity metal element/number of atoms of In) is, for example, below 0.50, preferably 0.40 or less, more preferably 0.30 or less, further more preferably 0.20 or less, and for example, 0.01 or more, preferably 0.05 or more, more preferably 0.10 or more. In this manner, excellent transparency and excellent bending resistance can be achieved.

In view of lowered resistance and transparency, as the electrically conductive oxide that forms the first oxide layer 6, an indium tin composite oxide (ITO), an indium gallium composite oxide (IGO), and an indium gallium zinc composite oxide (IGZO) are used, more preferably, an ITO is used.

The tin oxide ($SnO_2$) content contained in the ITO with respect to the total amount of the tin oxide and the indium oxide ($In_2O_3$) is, for example, 0.5 mass % or more, preferably 3 mass % or more, more preferably 6 mass % or more, further more preferably 8 mass % or more, particularly preferably 10 mass % or more, and for example, 35 mass % or less, preferably 20 mass % or less, more preferably 15 mass % or less, further more preferably 13 mass % or less. The indium oxide ($In_2O_3$) content is the remaining portion of the tin oxide ($SnO_2$) content. By setting the tin oxide ($SnO_2$) content contained in the ITO within a preferable range, a film quality change of an ITO film with time can be easily suppressed.

The electrically conductive oxide of the first oxide layer 6 may be either crystalline or amorphous, and in view of uniformly forming the metal layer 7, preferably, the electrically conductive oxide is amorphous. That is, the first oxide layer 6 is preferably an amorphous film, more preferably, an amorphous ITO film.

In the present invention, in a plane TEM image at a magnification of 25,000 times, when the area ratio of the crystal particle is 80% or less (preferably, 0% or more and 50% or less), it is defined as amorphous, and when the area ratio thereof is above 80%, it is defined as crystalline.

The content ratio of the ITO in the first oxide layer 6 is, for example, 95 mass % or more, preferably 98 mass % or more, more preferably 99 mass % or more, and for example, 100 mass % or less.

A thickness T1 of the first oxide layer 6 is, for example, 5 nm or more, preferably 20 nm or more, more preferably 30 nm or more, and for example, 60 nm or less, preferably 50 nm or less. When the thickness T1 of the first oxide layer 6 is within the above-described range, the visible ray transmittance of the light transmitting electrically conductive layer 4 can be easily adjusted to a high standard. The thickness T1 of the first oxide layer 6 is, for example, measured by cross-sectional observation with a transmission electron microscope (TEM).

6. Metal Layer

The metal layer 7, along with the first oxide layer 6 and the second oxide layer 8, is an electrically conductive layer that imparts electrically conductive properties to the light transmitting electrically conductive layer 4. The metal layer 7 is also a lowered resistance layer that reduces the surface resistance value of the light transmitting electrically conductive layer 4. The metal layer 7 is also preferably an infrared ray reflective layer for imparting a high infrared ray reflectance (particularly, average reflectance of the near infrared ray).

The metal layer 7 has a film shape (including a sheet shape), and is disposed on the upper surface of the first oxide layer 6 so as to be in contact with the upper surface of the first oxide layer 6.

The metal that forms the metal layer 7 is not particularly limited as long as the metal has a small surface resistance value, and examples thereof include one kind of metal selected from the group consisting of Ti, Si, Nb, In, Zn, Sn, Au, Ag, Cu, Al, Co, Cr, Ni, Pb, Pd, Pt, Cu, Ge, Ru, Nd, Mg, Ca, Na, W, Zr, Ta, and Hf and an alloy containing two or more kinds of metals.

As the metal, preferably, silver (Ag) and a silver alloy are used, more preferably, a silver alloy is used. When the metal is the silver or the silver alloy, the resistance value of the light transmitting electrically conductive layer 4 can be reduced and in addition, the light transmitting electrically conductive layer 4 having a particularly high average reflectance in a near infrared ray region is obtained, so that it can be preferably used for uses used outdoors or for windows.

The silver alloy contains silver as a main component and another metal as an auxiliary component. To be specific, examples of the silver alloy include Ag—Cu alloy, Ag—Pd alloy, Ag—Sn alloy, Ag—In alloy, Ag—Pd—Cu alloy, Ag—Pd—Cu—Ge alloy, Ag—Cu—Au alloy, Ag—Cu—Sn alloy, Ag—Cu—In alloy, Ag—Ru—Cu alloy, Ag—Ru—Au alloy, Ag—Nd alloy, Ag—Mg alloy, Ag—Ca alloy, and Ag—Na alloy. In view of lowered resistance and moist heat durability, as the silver alloy, preferably, an Ag—Cu alloy, an Ag—Cu—In alloy, an Ag—Cu—Sn alloy, an Ag—Pd alloy, and an Ag—Pd—Cu alloy are used.

The content ratio of the silver in the silver alloy is, for example, 80 mass % or more, preferably 90 mass % or more, more preferably 95 mass % or more, and for example, 99.9 mass % or less. The content ratio of the other metal in the silver alloy is the remaining portion of the above-described content ratio of the silver.

A thickness T3 of the metal layer 7 is, for example, 1 nm or more, preferably 5 nm or more, more preferably 8 nm or more, and for example, 20 nm or less, preferably 10 nm or less. By setting the thickness of the metal layer 7 within the above-described range, the surface resistance value and the bending resistance of the light transmitting electrically conductive layer 4 are excellent, and the visible ray transmittance and the infrared ray reflectance can be furthermore excellent. As a result, the coloration uniformity, the responsiveness, and the heat shielding properties of the EC light adjusting element 13 are excellent. The thickness T3 of the metal layer 7 is, for example, measured by cross-sectional observation with a transmission electron microscope (TEM).

7. Second Indium-Based Electrically Conductive Oxide Layer

The second oxide layer 8, along with the first oxide layer 6 and the metal layer 7, is an electrically conductive layer that imparts electrically conductive properties to the light transmitting electrically conductive layer 4. The second oxide layer 8 is also an optically adjusting layer for suppressing the visible ray reflectance of the metal layer 7 and improving the visible ray transmittance of the light transmitting electrically conductive layer 4.

The second oxide layer 8 is the uppermost layer of the light transmitting electrically conductive layer 4, has a film shape (including a sheet shape), and is disposed on the entire upper surface of the metal layer 7 so as to be in contact with the upper surface of the metal layer 7.

An example of the electrically conductive oxide that forms the second oxide layer 8 includes the electrically conductive oxide illustrated in the first oxide layer 6. Preferably, an electrically conductive oxide having indium (In) as a main metal element is used, more preferably, an ITO is used. The second oxide layer 8 is preferably an amorphous film, more preferably an amorphous ITO film.

The electrically conductive oxide that forms the second oxide layer 8 may be the same or different from the electrically conductive oxide that forms the first oxide layer 6. In view of bending resistance, electrically conductive properties, and transparency, preferably, the same electrically conductive oxide as that of the first oxide layer 6 is used.

The ratio of the number of atoms contained in the impurity metal element to that of the main metal element In in the second oxide layer 8 (number of atoms of impurity metal element/number of atoms of In) is the same as or not less than "the number of atoms of impurity metal element/the number of atoms of In" in the first oxide layer 6 (for example, 0.001 or more).

When the second oxide layer 8 is made of the ITO, the tin oxide ($SnO_2$) content contained in the ITO, and the ratio of the number of atoms of Sn to that of In are the same as those of the first oxide layer 6.

The content ratio of the ITO in the second oxide layer 8 is, for example, 95 mass % or more, preferably 98 mass % or more, more preferably 99 mass % or more, and for example, 100 mass % or less.

A thickness T2 of the second oxide layer 8 is, for example, 5 nm or more, preferably 20 nm or more, more preferably 30 nm or more, and for example, 60 nm or less, preferably 50 nm or less. When the thickness T2 of the second oxide layer 8 is within the above-described range, the visible ray transmittance of the light transmitting electrically conductive layer 4 can be easily adjusted to a high standard. The thickness T2 of the second oxide layer 8 is, for example, measured by cross-sectional observation with a transmission electron microscope (TEM).

The ratio (T2/T1) of the thickness T2 of the second oxide layer 8 to the thickness T1 of the first oxide layer 6 is, for example, 0.5 or more, preferably 0.75 or more, and for example, 1.5 or less, preferably 1.25 or less.

The ratio (T2/T3) of the thickness T2 of the second oxide layer 8 to the thickness T3 of the metal layer 7 is, for example, 2.0 or more, preferably 3.0 or more, and for example, 10 or less, preferably 8.0 or less.

8. EC Light Adjusting Layer

The EC light adjusting layer 5 is a light adjusting layer that changes a light transmittance and a color by an electric current that is electrically conducted via the light transmitting electrically conductive layer 4.

The EC light adjusting layer 5 is the uppermost layer of the EC light adjusting member 1, has a film shape (including a sheet shape), and is disposed on the entire upper surface of the light transmitting electrically conductive layer 4 so as to be in contact with the upper surface of the light transmitting electrically conductive layer 4.

The EC light adjusting layer 5 sequentially includes a first electrochromic compound layer 10 (first EC layer), an electrolyte layer 11, and a second electrochromic compound layer 12 (second EC layer). That is, the EC light adjusting layer 5 includes the first EC layer 10 that is disposed on the light transmitting electrically conductive layer 4, the electrolyte layer 11 that is disposed on the first EC layer 10, and the second EC layer 12 that is disposed on the electrolyte layer 11. Preferably, the EC light adjusting layer 5 is made of only the first EC layer 10, the electrolyte layer 11, and the second EC layer 12.

The thickness of the EC light adjusting layer 5, that is, the total thickness of the first EC layer 10, the electrolyte layer 11, and the second EC layer 12 is, for example, 0.1 µm or more and 5000 µm or less.

9. First Electrochromic Compound Layer

The first EC layer 10, along with the second EC layer 12 to be described later, is a light adjusting layer that changes a light transmittance and a color in accordance with an electric current that flows in the first EC layer 10.

The first EC layer 10 is the lowermost layer of the EC light adjusting layer 5, has a film shape (including a sheet shape), and is disposed on the entire upper surface of the light transmitting electrically conductive layer 4 so as to be in contact with the upper surface of the light transmitting electrically conductive layer 4.

An electrochromic compound that forms the first EC layer 10 is not limited, and examples thereof include inorganic electrochromic compounds such as tungsten oxide (for example, $WO_3$), molybdenum oxide, vanadium oxide, indium oxide, iridium oxide, nickel oxide, and Prussian blue and organic electrochromic compounds such as phthalocyanine compound, styryl compound, viologen compound, polypyrrole, polyaniline, and polythiophene (for example, poly(ethylenedioxythiophene)-poly(styrene sulfonic acid)). Preferably, a tungsten oxide and a polythiophene are used.

The thickness of the first EC layer 10 is, for example, 0.01 µm or more, preferably 0.05 µm or more, and for example, 3000 µm or less, preferably 100 µm or less, more preferably 10 µm or less, further more preferably 0.5 µm or less.

10. Electrolyte Layer

The electrolyte layer 11 is a layer that is efficiently electrically conducted to an electrochromic compound at the inside of the first EC layer 10 and the second EC layer 12.

The electrolyte layer 11 is disposed on the entire upper surface of the first EC layer 10 so as to be in contact with the upper surface of the first EC layer 10.

The electrolyte layer 11 may be formed of a liquid electrolyte and a sealing material that seals the liquid electrolyte, or may be formed of a solid electrolyte film.

As the electrolyte that forms the electrolyte layer 11 is not limited, and examples thereof include alkali metal salts such as $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$ or alkaline earth metal salts. Also, examples thereof include quaternary ammonium salt and quaternary phosphonium salt.

When the liquid electrolyte is used as the electrolyte layer 11, preferably, an organic solvent is used in combination with the electrolyte. The organic solvent is not limited as long as the electrolyte is capable of being dissolved. Examples thereof include carbonates such as ethylene carbonate, propylene carbonate and methyl carbonate; furans such as tetrahydrofuran; γ-butyrolactone, 1,2-dimethoxyethane, 1,3-dioxolane, 4-methyl-1,3-dioxolane, methyl formate, methyl acetate, methyl propionate, acetonitrile, propylene carbonate, and N,N-dimethylformamide.

As the electrolyte layer 11, preferably, an electrolyte film containing an electrolyte, an organic solvent, and a binder resin is used. The electrolyte layer 11 is obtained by, for example, mixing an electrolyte solution in which the electrolyte is dissolved in the organic solvent with the binder resin to be then dried.

Examples of the binder resin include acrylic resins such as polymethyl methacrylate.

The thickness of the electrolyte layer 11 is, for example, 0.01 μm or more, preferably 1 μm or more, and for example, 3000 μm or less, preferably 1000 μm or less, more preferably 100 μm or less.

11. Second Electrochromic Compound Layer

The second EC layer 12, along with the first EC layer 10, is a light adjusting layer that changes the light transmittance and the color in accordance with the electric current that flows in the second EC layer 12.

The second EC layer 12 is the uppermost layer of the EC light adjusting layer 5, has a film shape (including a sheet shape), and is disposed on the entire upper surface of the electrolyte layer 11 so as to be in contact with the upper surface of the electrolyte layer 11.

An electrochromic compound that forms the second EC layer 12 is not limited, and a compound illustrated in the first EC layer 10 is used. Preferably, a tungsten oxide and a polythiophene are used.

The thickness of the second EC layer 12 is, for example, 0.01 μm or more, preferably 0.05 μm or more, and for example, 3000 μm or less, preferably 100 μm or less, more preferably 10 μm or less, further more preferably 0.5 μm or less.

12. Light Transmitting Electrically Conductive Film

Of the members that constitute the EC light adjusting member 1, the transparent substrate 2, the protecting layer 3, and the light transmitting electrically conductive layer 4 constitute one embodiment of the light transmitting electrically conductive film 9 of the present invention.

Figure 2:
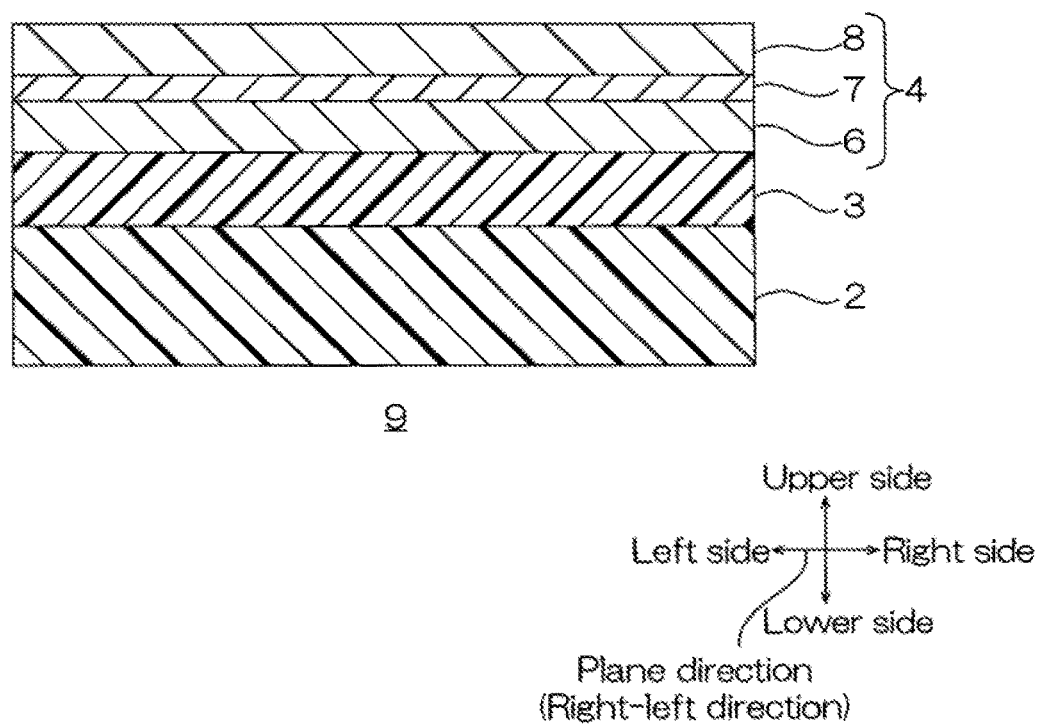
FIG. 2 shows a cross-sectional view of one embodiment of a light transmitting electrically conductive film of the present invention constituting the electrochromic light adjusting member shown in FIG. 1.

That is, as shown in FIG. 2, the light transmitting electrically conductive film 9 is a laminate film that sequentially includes the transparent substrate 2, the protecting layer 3, and the light transmitting electrically conductive layer 4. That is, the light transmitting electrically conductive film 9 includes the transparent substrate 2, the protecting layer 3 that is disposed at the upper side of the transparent substrate 2, and the light transmitting electrically conductive layer 4 that is disposed at the upper side of the protecting layer 3. Preferably, the light transmitting electrically conductive film 9 is made of only the transparent substrate 2, the protecting layer 3, and the light transmitting electrically conductive layer 4.

The light transmitting electrically conductive film 9 forms a film shape (including a sheet shape) having a predetermined thickness, extends in the plane direction, and has a flat upper surface and a flat lower surface. The light transmitting electrically conductive film 9 is a component for fabricating the EC light adjusting member 1, and to be specific, an electrode substrate used for the EC light adjusting member 1. The light transmitting electrically conductive film 9 does not include a light source such as LED and an external power source, and is an industrially available device whose component alone can be circulated. The light transmitting electrically conductive film 9 is a film through which the visible ray transmits, and includes a transparent electrically conductive film.

The light transmitting electrically conductive film 9 may be the light transmitting electrically conductive film 9 that is thermally contracted, or may be the light transmitting electrically conductive film 9 that is unheated, that is, uncontracted. In view of excellent bending resistance, preferably, the light transmitting electrically conductive film 9 that is thermally contracted is used.

The total thickness of the light transmitting electrically conductive film 9 is, for example, 2 μm or more, preferably 20 μm or more, and for example, 300 μm or less, preferably 200 μm or less, more preferably 150 μm or less.

13. Producing Method of EC Light Adjusting Member

Next, a method for producing the EC light adjusting member 1 is described.

To produce the EC light adjusting member 1, first, the light transmitting electrically conductive film 9 is fabricated, and next, the EC light adjusting layer 5 is disposed on the light transmitting electrically conductive film 9.

The light transmitting electrically conductive film 9 is, for example, obtained by disposing the protecting layer 3 and the light transmitting electrically conductive layer 4 on the transparent substrate 2 in the above-described order.

In this method, as referred to FIG. 1, first, the transparent substrate 2 is prepared.

Next, a resin composition is, for example, disposed on the upper surface of the transparent substrate 2 by a wet process.

To be specific, first, the resin composition is applied to the upper surface of the transparent substrate 2. Thereafter, when the resin composition contains an active energy ray curable resin, an active energy ray is applied.

In this manner, the protecting layer 3 in a film shape is formed on the entire upper surface of the transparent substrate 2. That is, a protecting layer-including transparent substrate that includes the transparent substrate 2 and the protecting layer 3 is obtained.

Thereafter, the protecting layer-including transparent substrate is subjected to the degassing treatment as needed.

To subject the protecting layer-including transparent substrate to the degassing treatment, the protecting layer-including transparent substrate is left to stand under a reduced pressure atmosphere of, for example, $1 \times 10^{-1}$ Pa or less, preferably $1 \times 10^{-2}$ Pa or less, and for example, $1 \times 10^{-3}$ Pa or more. The degassing treatment is, for example, performed by using an exhauster (to be specific, turbomolecular pump or the like) provided in a dry process device.

By the degassing treatment, a part of the water contained in the transparent substrate 2 and a part of an organic substance contained in the protecting layer 3 are emitted to the outside.

Next, the light transmitting electrically conductive layer 4 is, for example, disposed on the upper surface of the protecting layer 3 by a dry process.

To be specific, each of the first oxide layer 6, the metal layer 7, and the second oxide layer 8 is sequentially disposed by the dry process.

Examples of the dry process include vacuum deposition method, sputtering method, and ion plating method. Preferably, a sputtering method is used. To be specific, a magnetron sputtering method is used.

An example of a gas used in the sputtering method includes an inert gas such as Ar. Also, a reactive gas such as oxygen can be used in combination as needed. When the reactive gas is used in combination, the flow ratio of the reactive gas is not particularly limited, and the ratio of the flow rate of the reactive gas to that of the inert gas is, for example, 0.1/100 or more, preferably 1/100 or more, and for example, 5/100 or less.

To be specific, in forming the first oxide layer 6, as the gas, preferably, the inert gas and the reactive gas are used in combination. In forming the metal layer 7, as the gas, preferably, the inert gas is used alone. In forming the second oxide layer 8, as the gas, preferably, the inert gas and the reactive gas are used in combination.

When the sputtering method is used, as a target material, the above-described electrically conductive oxide or the above-described metal that constitutes each of the layers is used.

A power source used in the sputtering method is not limited, and for example, a DC power source, a MF/AC power source, and a RF power source are used alone or in combination of two or more. Preferably, a DC power source is used.

When the first oxide layer 6 is formed by the sputtering method, preferably, the transparent substrate 2 (and the protecting layer 3) is cooled. To be specific, the lower surface of the transparent substrate 2 is brought into contact with a cooling device (for example, cooling roll) or the like, and the transparent substrate 2 (and the protecting layer 3) is cooled. In this manner, when the first oxide layer 6 is formed, water contained in the transparent substrate 2 and an organic substance contained in the protecting layer 3 are emitted by vapor deposition heat or the like generated by the sputtering, and it can be suppressed that the water is excessively contained in the first oxide layer 6. The cooling temperature is, for example, −30° C. or more, preferably −10° C. or more, and for example, 60° C. or less, preferably 40° C. or less, more preferably 20° C. or less, further more preferably below 0° C.

In this manner, as shown in FIG. 2, the light transmitting electrically conductive film 9 that sequentially includes the transparent substrate 2, the protecting layer 3, and the light transmitting electrically conductive layer 4 (the first oxide layer 6, the metal layer 7, and the second oxide layer 8) is obtained.

Next, a heating step is performed as needed. That is, the light transmitting electrically conductive film 9 is heated. By heating the light transmitting electrically conductive film 9 to be contracted, the bending resistance can be improved.

As the heating conditions, the heating temperature is, for example, 50° C. or more, preferably 80° C. or more, and for example, 180° C. or less, preferably 140° C. or less. The heating time is, for example, 1 minute or more, preferably 10 minutes or more, and for example, 120 minutes or less, preferably 60 minutes or less. By setting the heating conditions within the above-described range, the light transmitting electrically conductive film 9 can be easily contracted, while the amorphous properties of the first oxide layer 6 and the second oxide layer 8 are retained.

The heating may be performed under an air atmosphere, an inert atmosphere, or a vacuum atmosphere.

By the heating step, the light transmitting electrically conductive film 9 in which it is slightly contracted in at least one direction (preferably, any one direction) of the front-rear direction and the right-left direction is obtained.

A contraction ratio with respect to 100% of the length in the front-rear direction or the length in the right-left direction of the light transmitting electrically conductive film 9 before contraction is, for example, 0.1% or more, preferably 0.2% or more, and for example, 1.0% or less, preferably 0.5% or less, more preferably 0.3% or less.

Next, the EC light adjusting layer 5 is disposed in the light transmitting electrically conductive film 9.

A known material can be used for the EC light adjusting layer 5.

The EC light adjusting layer 5 is disposed on the upper surface of the light transmitting electrically conductive film 9 so that the EC light adjusting layer 5 is in contact with the second indium-based electrically conductive oxide layer 8.

In this manner, as shown in FIG. 1, the EC light adjusting member 1 that sequentially includes the transparent substrate 2, the protecting layer 3, the light transmitting electrically conductive layer 4, and the EC light adjusting layer 5 is obtained.

The above-described producing method can be also performed by a roll-to-roll method. Also, a part or all of the method can be performed by a batch method.

The light transmitting electrically conductive layer 4 can be also formed into a pattern shape such as wiring pattern by etching as needed.

14. Function and Effect

According to the EC light adjusting member 1, the surface resistance value of the light transmitting electrically conductive layer 4 is low, and the lowered resistance is excellent. Thus, the responsiveness and the energy conservation of the EC light adjusting layer 5 are excellent. Also, the bending resistance of the EC light adjusting member 1 is excellent, so that when the EC light adjusting member 1 is bent, an occurrence of a crack in the light transmitting electrically conductive layer 4 can be suppressed. Thus, a reduction of the light adjusting function of the EC light adjusting layer 5 can be suppressed.

When both of the first oxide layer 6 and the second oxide layer 8 are an amorphous film, the bending resistance of the EC light adjusting member 1 is furthermore excellent.

According to the light transmitting electrically conductive film 9 used for the EC light adjusting member 1, the surface resistance value of the light transmitting electrically conductive layer 4 is low, and the lowered resistance is excellent. Thus, the responsiveness and the energy conservation of the EC light adjusting layer 5 that is disposed on the surface of the light transmitting electrically conductive film 9 can be improved. Also, the bending resistance of the light transmitting electrically conductive film 9 is excellent, so that when the light transmitting electrically conductive film 9 is bent, an occurrence of a crack in the light transmitting electrically conductive layer 4 can be suppressed. Thus, a reduction of the light adjusting function of the EC light adjusting layer 5 that is disposed on the surface of the light transmitting electrically conductive film 9 can be suppressed.

According to the light transmitting electrically conductive film 9, the light transmitting electrically conductive layer 4 that includes the first oxide layer 6 and the second oxide layer 8 on the upper surface and the lower surface of the metal layer 7 is included, so that when the light transmitting electrically conductive layer 4 includes the metal layer 7 having a generally high visible ray reflectance (to be specific, the metal layer 7 having a reflectance at a wavelength of 550 nm of, for example, 15% or more, furthermore 30% or more), a high visible ray transmittance can be realized. The visible ray transmittance of the light transmitting electrically conductive film 9 is, for example, 60% or more, preferably 80% or more, more preferably 85% or more, and for example, 95% or less. In this manner, the transparency is excellent.

According to the light transmitting electrically conductive film 9, the metal layer 7 having a high reflectance in a near infrared ray region (for example, the metal layer 7 including silver or a silver alloy) is included in the light transmitting electrically conductive layer 4, so that the average reflectance of the near infrared ray is high, and a heat ray such as the sunlight can be efficiently shielded. Thus, the light transmitting electrically conductive film 9 can be preferably used for a light adjusting device used in the environment in which a panel temperature is easily increased (for example, outdoors, windows, or the like).

The average reflectance of the near infrared ray (wavelength of 800 or more and 1500 nm or less) of the light transmitting electrically conductive film 9 is, for example, 10% or more, preferably 20% or more, more preferably 40% or more, further more preferably 50% or more, and for example, 95% or less, preferably 90% or less.

The average transmittance of the near infrared ray (wavelength of 800 or more and 1500 nm or less) of the light transmitting electrically conductive film 9 is, for example, 80% or less, preferably 60% or less, more preferably 50% or less, further more preferably 40% or less, and for example, 10% or more, preferably 20% or more.

15. Electrochromic Light Adjusting Element

An electrochromic light adjusting element 13 (hereinafter, also abbreviated as an EC light adjusting element) forms a film shape (including a sheet shape) having a predetermined thickness, extends in a predetermined direction perpendicular to the thickness direction (the front-rear direction and the right-left direction, that is, the plane direction), and has a flat upper surface and a flat lower surface (two main surfaces). The EC light adjusting element 13 is, for example, one component of a light adjusting panel or the like provided in a light adjusting device, that is, not the light adjusting device. That is, the EC light adjusting element 13 is a component for fabricating the light adjusting device or the like, does not include a light source such as LED and an external power source, and is an industrially available device whose component alone can be circulated.

Figure 3:
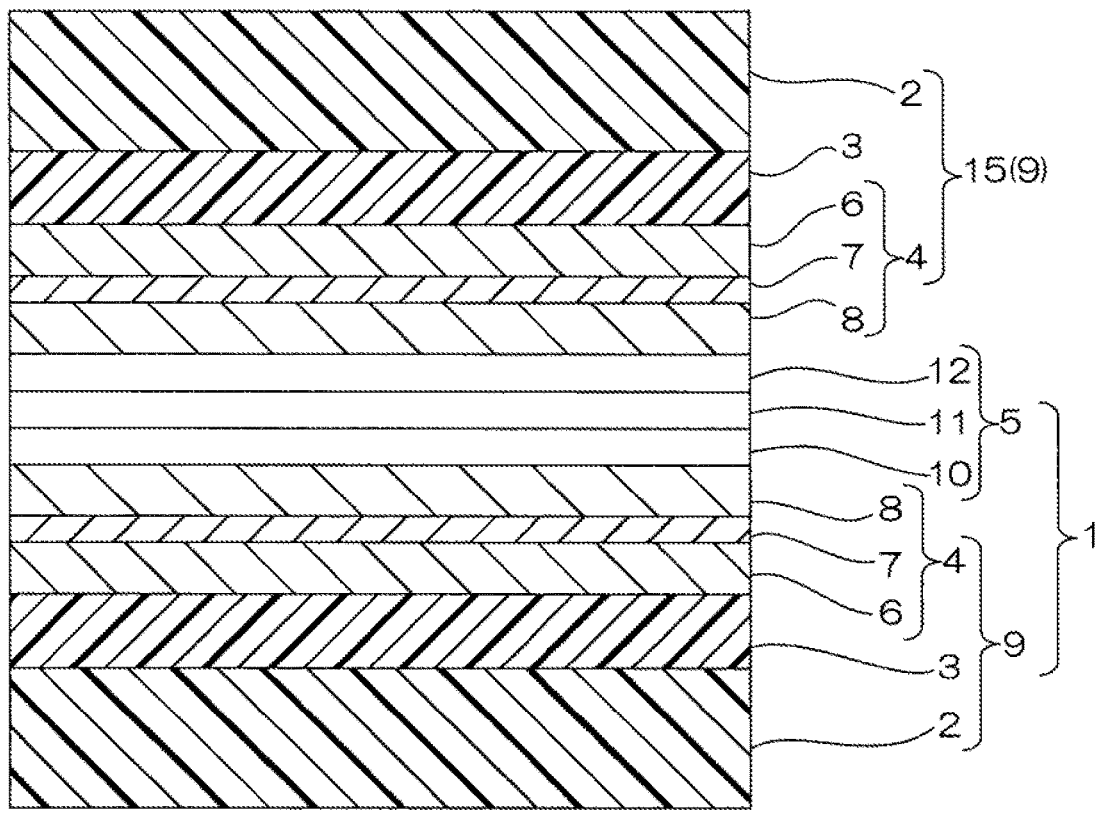
FIG. 3 shows a cross-sectional view of one embodiment of an electrochromic light adjusting element of the present invention including the electrochromic light adjusting member shown in FIG. 1.
Figure 3:
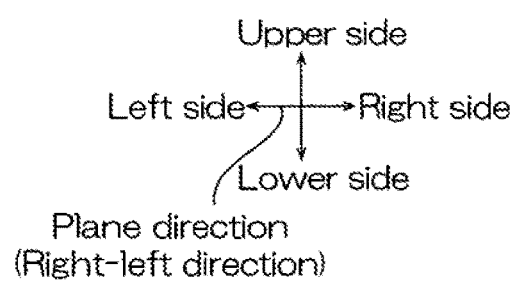

To be specific, as shown in FIG. 3, the EC light adjusting element 13 is a laminate film that includes the EC light adjusting member 1 and an electrode substrate (upper-side electrode substrate) 15. That is, the EC light adjusting element 13 includes the EC light adjusting member 1 and the electrode substrate 15 that is disposed at the upper side of the EC light adjusting member 1. Preferably, the EC light adjusting element 13 is made of only the EC light adjusting member 1 and the electrode substrate 15. In the following, each of the layers is described in detail.

The electrode substrate 15 is preferably the above-described light transmitting electrically conductive film 9, and sequentially includes the light transmitting electrically conductive layer 4, the protecting layer 3, and the transparent substrate 2. The electrode substrate 15 is disposed at the upper side of the EC light adjusting member 1. To be specific, the electrode substrate 15 is disposed on the entire upper surface (surface opposite to the transparent substrate 2 of the lower-side light transmitting electrically conductive film 9) of the EC light adjusting layer 5 so that the upper surface of the EC light adjusting layer 5 is in contact with the lower surface of the light transmitting electrically conductive layer 4.

That is, in the EC light adjusting element 13, the two light transmitting electrically conductive films 9 are disposed to face each other so that each of the light transmitting electrically conductive layers 4 is in contact with the surface (the lower surface or the upper surface) of the EC light adjusting layer 5.

According to the EC light adjusting element 13, the surface resistance value of the light transmitting electrically conductive layer 4 is low, and the lowered resistance is excellent. Thus, the responsiveness and the energy conservation of the EC light adjusting layer 5 are excellent. Also, the bending resistance of the EC light adjusting element 13 is excellent, so that when the EC light adjusting element 13 is bent, an occurrence of a crack in the light transmitting electrically conductive layer 4 can be suppressed. Thus, a reduction of the light adjusting function of the EC light adjusting layer 5 can be suppressed. That is, a reduction of the uniformity at the time of coloration or decoloration of the EC light adjusting layer 5 is suppressed, and an occurrence of color unevenness can be suppressed. Also, the EC light adjusting element 13 has an excellent reflectance of the near infrared ray, so that it has excellent heat shielding properties.

16. Modified Example

In the modified example, the same reference numerals are provided for members and steps corresponding to each of those in the above-described embodiment, and their detailed description is omitted.

Figure 4:
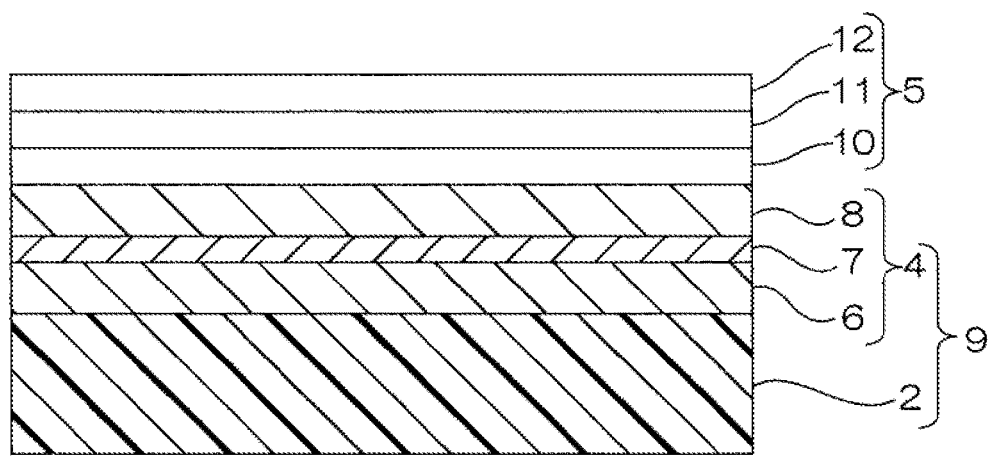
FIG. 4 shows a modified example of the electrochromic light adjusting member, and shows a cross-sectional view of the electrochromic light adjusting member in which a first indium-based electrically conductive oxide layer is directly disposed on the upper surface of a transparent substrate.
Figure 4:
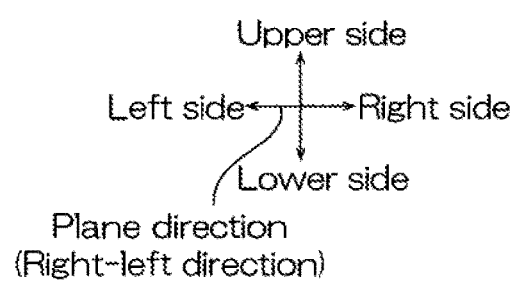

In one embodiment of the EC light adjusting member 1, as shown in FIG. 1, the protecting layer 3 is interposed between the transparent substrate 2 and the first oxide layer 6. Alternatively, for example, as shown in FIG. 4, the first oxide layer 6 can be also directly disposed on the upper surface of the transparent substrate 2. That is, the EC light adjusting member 1 sequentially includes the transparent substrate 2, the light transmitting electrically conductive layer 4, and the EC light adjusting layer 5. Meanwhile, the EC light adjusting member 1 does not include the protecting layer 3.

Figure 5:
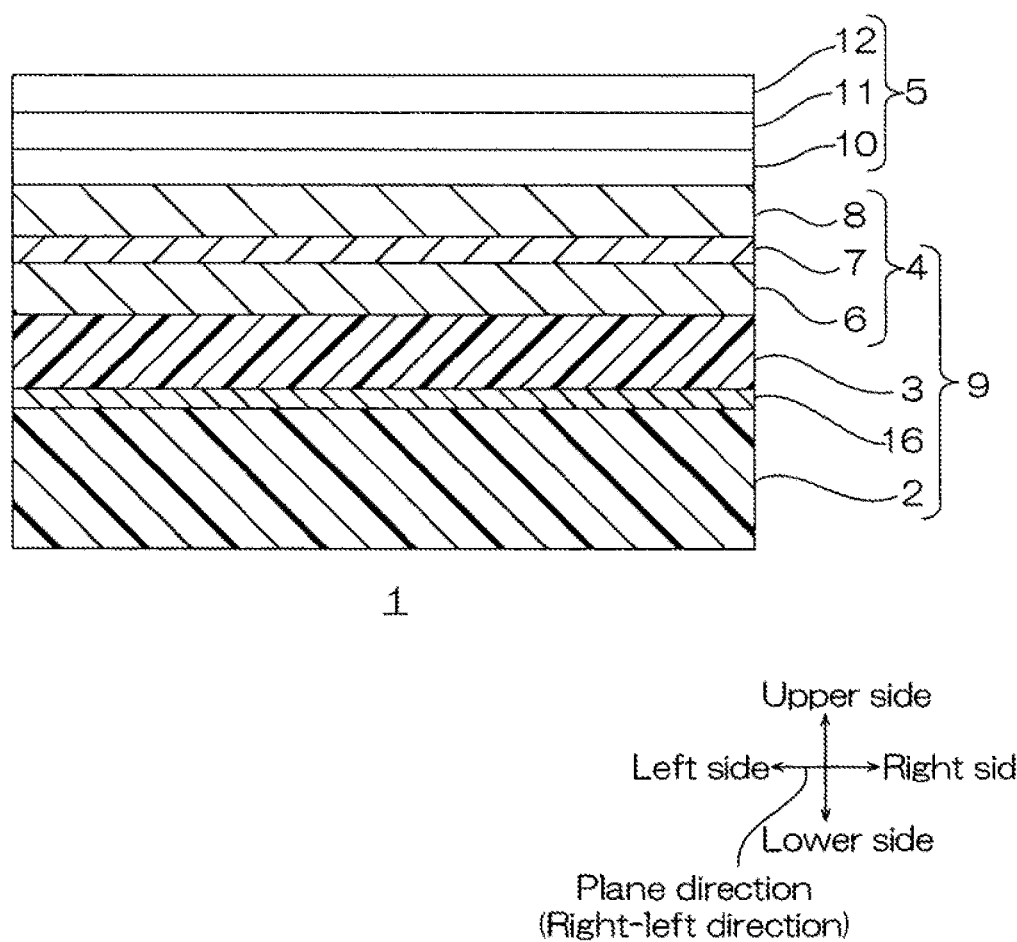
FIG. 5 shows a modified example of the electrochromic light adjusting member, and shows a cross-sectional view of the electrochromic light adjusting member in which an inorganic substance layer is interposed between a protecting layer and the first indium-based electrically conductive oxide layer.

In one embodiment of the EC light adjusting member 1, as shown in FIG. 1, the first oxide layer 6 is directly disposed on the upper surface of the protecting layer 3. Alternatively, for example, as shown in FIG. 5, an inorganic substance layer 16 can be also interposed between the protecting layer 3 and the first oxide layer 6.

The inorganic substance layer 16, along with the protecting layer 3, is also an optically adjusting layer that adjusts optical properties of the EC light adjusting member 1 so as to suppress visual recognition of the wiring pattern in the light transmitting electrically conductive layer 4. The inorganic substance layer 16 has a film shape (including a sheet shape), and is disposed on the entire upper surface of the protecting layer 3 so as to be in contact with the upper surface of the protecting layer 3. The inorganic substance layer 16 has predetermined optical properties, and is prepared from, for example, an inorganic substance such as oxide and fluoride. The thickness of the inorganic substance layer 16 is, for example, 1 nm or more, preferably 5 nm or more, more preferably 10 nm or more, and for example, 80 nm or less, preferably 40 nm or less, more preferably 25 nm or less.

In the above-described modified example, the EC light adjusting member 1 is described, and the light transmitting electrically conductive film 9 and the EC light adjusting element 13 are the same.

In the EC light adjusting element 13, as shown in FIG. 3, as the upper-side electrode substrate 15, the light transmitting electrically conductive film 9 of the present invention is used. Alternatively, for example, though not shown, the upper-side electrode substrate 15 can be also constituted from the transparent substrate 2 and a single electrically conductive layer. Examples of the single electrically conductive layer include ITO film (crystalline ITO film, amorphous ITO film), IGO film, and IGZO film.

EXAMPLES

In the following, the present invention is further described based on Examples and Comparative Examples. The present invention is however not limited by Examples and Comparative Examples. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Light Transmitting Electrically Conductive Film

Example 1

(Preparation of Film Substrate and Forming of Protecting Layer)

First, a transparent substrate that was made of a long polyethylene terephthalate (PET) film and having a thickness of 50 μm was prepared.

Next, an ultraviolet ray curable resin that was made of an acrylic resin was applied to the upper surface of the transparent substrate to cure by the application of the ultraviolet ray, so that a protecting layer made of a curable resin layer and having a thickness of 2 μm was formed. In this manner, a protecting layer-including transparent substrate roll including the transparent substrate and the protecting layer was obtained.

(Forming of First Indium-Based Electrically Conductive Oxide Layer)

Next, the protecting layer-including transparent substrate roll was set in a vacuum spat device to be then vacuum-evacuated until an atmospheric pressure at the time of non-conveyance was $4\times10^{-3}$ Pa (degassing treatment). At this time, in a state of not introducing a sputtering gas (Ar and $O_2$), a part of the protecting layer-including transparent substrate was conveyed, and it was confirmed that the atmospheric pressure increased until $2\times10^{-2}$ Pa. In this manner, it was confirmed that a sufficient amount of gas remained in the protecting layer-including transparent substrate roll.

Next, a first indium-based electrically conductive oxide layer made of an amorphous ITO and having a thickness of 40 nm was formed on the upper surface of the curable resin layer by sputtering, while the protecting layer-including transparent substrate roll was delivered.

To be specific, under a vacuum atmosphere at an atmospheric pressure of 0.3 Pa in which Ar and $O_2$ were introduced (as flow ratio, Ar:$O_2$=100:1.4), a target made of a sintered body of 12 mass % of tin oxide and 88 mass % of indium oxide was sputtered by using a direct-current (DC) power source.

When the first indium-based electrically conductive oxide layer was formed by sputtering, the lower surface of the protecting layer-including transparent substrate roll (to be specific, the lower surface of the transparent substrate) was brought into contact with a cooling roll at −5° C., so that the protecting layer-including transparent substrate roll was cooled.

(Forming of Metal Layer) A metal layer made of an Ag—Cu alloy and having a thickness of 8 nm was formed on the upper surface of the first indium-based electrically conductive oxide layer by sputtering.

To be specific, under a vacuum atmosphere at an atmospheric pressure of 0.3 Pa into which Ar was introduced, an Ag alloy (manufactured by Mitsubishi Materials Corporation, part number: "No. 317") was sputtered by using a direct-current (DC) power source as a power source.

(Forming of Second Indium-Based Electrically Conductive Oxide Layer)

A second indium-based electrically conductive oxide layer made of an amorphous ITO and having a thickness of 38 nm was formed on the upper surface of the metal layer by sputtering.

To be specific, under a vacuum atmosphere at an atmospheric pressure of 0.4 Pa in which Ar and $O_2$ were introduced (as flow ratio, Ar:$O_2$=100:1.5), a target made of a sintered body of 12 mass % of tin oxide and 88 mass % of indium oxide was sputtered by using a direct-current (DC) power source.

In this manner, a light transmitting electrically conductive film in which the protecting layer, the first indium-based electrically conductive oxide layer, the metal layer, and the second indium-based electrically conductive oxide layer were sequentially formed on the transparent substrate was obtained (ref: FIG. 2).

Example 2

The light transmitting electrically conductive film obtained in Example 1 was subjected to a heating step under the conditions of an air atmosphere at 140° C. for 30 minutes. In this manner, one direction (conveyance direction) of the light transmitting electrically conductive film was contracted by 0.3%, so that a light transmitting electrically conductive film of Example was obtained.

Examples 3 to 7

Each of the light transmitting electrically conductive films of Examples was obtained in the same manner as that of Example 1, except that the thickness of the metal layer or the transparent substrate was changed to that described in Table 1.

Examples 8 to 9

Each of the light transmitting electrically conductive films of Examples was obtained in the same manner as that of Example 1, except that the material of the transparent substrate was changed to that (COP: cycloolefin polymer, PC: polycarbonate resin) described in Table 1.

Comparative Example 1

A light transmitting electrically conductive film of Comparative Example 1 was obtained in the same manner as that of Example 1, except that the thickness of the first indium-based electrically conductive oxide layer was changed to 30 nm, and the metal layer and the second indium-based electrically conductive oxide layer were not formed.

Comparative Example 2

A light transmitting electrically conductive film of Comparative Example 2 was obtained in the same manner as that of Example 1, except that the thickness of the first indium-based electrically conductive oxide layer was changed to 100 nm, and the metal layer and the second indium-based electrically conductive oxide layer were not formed.

Comparative Example 3

A light transmitting electrically conductive film was obtained in the same manner as that of Example 1, except that the thickness of the first indium-based electrically conductive oxide layer was changed to 25 nm, and the metal layer and the second indium-based electrically conductive oxide layer were not formed. Next, the light transmitting electrically conductive film was subjected to a heating step under the conditions of an air atmosphere at 140° C. for 60 minutes. In this manner, one direction (conveyance direction) of the light transmitting electrically conductive film was contracted by 0.3%, so that a light transmitting electrically conductive film of Comparative Example 3 was obtained.

(Measurement)

(1) Thickness

The thickness of the protecting layer, the first indium-based electrically conductive oxide layer, the metal layer, and the second indium-based electrically conductive oxide layer was measured by cross-sectional observation by using a transmission electron microscope (manufactured by Hitachi, Ltd., HF-2000). The thickness of the transparent substrate was measured by using a film thickness meter (manufactured by Ozaki MFG CO., LTD., digital dial gauge DG-205).

(2) Surface Resistance Value of Light Transmitting Electrically Conductive Layer An initial surface resistance value $R_0$ of the light transmitting electrically conductive layer was measured in conformity with a four point probe method of JIS K 7194 (in 1994). The results are shown in Table 1.

(3) Bending Resistance Test

Each of the light transmitting electrically conductive films of Examples and Comparative Examples was cut into a piece having a width of 10 mm and a length of 150 mm. The cut light transmitting electrically conductive film 9 was disposed on a mandrel 20 having a diameter of 5 mm so as to have such a state that the light transmitting electrically conductive layer 4 was the outside and the transparent substrate 2 was in contact with the mandrel 20. Subsequently, both ends in a lengthwise direction of the light transmitting electrically conductive film 9 were fastened with a clip 21, and a weight 22 having a weight of 500 g was attached to the center of the clip 21 (ref: FIG. 6). That is, a load of 50 g/mm was applied downwardly with respect to the width of the light transmitting electrically conductive film 9 to bend the light transmitting electrically conductive film 9. This bent state was retained for 10 seconds.

A surface resistance value $R_1$ after being bent was measured in the same manner as the above-described four point probe method, and subsequently, a ratio ($R_1/R_0$) of the surface resistance value $R_1$ after being bent to the initial surface resistance value $R_0$ was calculated. The results are shown in Table 1.

The diameter of the mandrel 20 was changed, and the light transmitting electrically conductive film 9 was bent in the same manner as that described above (ref: FIG. 6), so that the diameter (limit diameter) in which $R_1/R_0$ was above 1.05 was obtained. To be specific, the diameter of the mandrel 20 was changed from the large diameter to the small diameter by 1 mm, and the diameter of the mandrel 20 immediately before $R_1/R_0$ was above 1.05 was measured. The results are shown in Table 1.

(4) Visible Ray Transmittance

By using a haze meter (manufactured by Suga Test Instruments Co., Ltd., device name: "HGM-2DP"), a total light transmittance of the light transmitting electrically conductive film was measured to be defined as a visible ray transmittance. The results are shown in Table 1.

(5) Near Infrared Ray Average Transmittance, Near Infrared Ray Average Reflectance By using a spectrophotometer (manufactured by Hitachi High-Tech Fielding Corporation, device name: "U-4100"), the average transmittance and the average reflectance of the light transmitting electrically conductive film were measured at a wavelength of 800 to 1500 nm. The results are shown in Table 1.

EC Light Adjusting Element

Example 1

The two light transmitting electrically conductive films of Example 1 were prepared to be bent in the same manner as that described above (ref: FIG. 6) by using a mandrel having a diameter of 5 mm. Each of these films was defined as a lower-side electrode substrate and an upper-side electrode substrate.

An EC light adjusting layer (laminate of a first electrochromic compound layer/an electrolyte layer/a second electrochromic compound layer) was prepared. The EC light adjusting layer was laminated between the lower-side electrode substrate and the upper-side electrode substrate so that each of the light transmitting electrically conductive layers was in contact with the surface (the upper surface or the lower surface) of the EC light adjusting layer, thereby producing an EC light adjusting element of Example 1 (ref: FIG. 3).

In the EC light adjusting layer, the first EC compound layer was a $WO_3$ film having a thickness of 200 nm, and the second EC compound layer was a poly(3,4-ethylenedioxythiophene)-poly(styrene sulfonic acid) film having a thickness of 60 nm. The electrolyte layer was an electrolyte film (thickness of 80 μm) obtained by mixing a polymethyl methacrylate with an electrolyte solution in which LiCF$_3$SO$_3$ was dissolved in a solvent of acetonitrile/propylene carbonate to be then dried.

Examples 2 to 9

Each of the EC light adjusting elements of Examples was produced in the same manner as that described above, except that each of the light transmitting electrically conductive films of Examples was used for each of the lower-side electrode substrate and the upper-side electrode substrate.

Comparative Examples 1 to 3

Each of the EC light adjusting elements of Comparative Examples was produced in the same manner as that described above, except that each of the light transmitting electrically conductive films of Comparative Examples was used for each of the lower-side electrode substrate and the upper-side electrode substrate.

(1) Coloration Uniformity Test (Bending Resistance Test)

An electric current was flowed in each of the EC light adjusting elements of Examples and Comparative Examples, and a color change of the EC light adjusting layer at a bent portion was confirmed.

In the bent portion, a case where the EC light adjusting layer was uniformly changed was evaluated as "Good", a case where an unevenness slightly occurred in the change of the EC light adjusting layer was evaluated as "Poor", and a case where an unevenness occurred in the change of the EC light adjusting layer was evaluated as "Bad". The results are shown in Table 1.

(2) Responsiveness Test

Each of the EC light adjusting elements of Examples and Comparative Examples was produced in the same manner as that described above without performing the bending of the mandrel with respect to the light transmitting electrically conductive film. When an electric current was flowed in each of the EC light adjusting elements to measure the responsiveness of the EC light adjusting layer, it was confirmed that excellent responsiveness was represented in accordance with the low surface resistance value of the light transmitting electrically conductive layer.

To be specific, the evaluation was conducted as follows. The results are shown in Table 1.

Good: the color of the EC light adjusting element was changed within 10 seconds of the application of an electric voltage.

Poor: the color of the EC light adjusting element was changed from 10 seconds to 1 minute of the application of an electric voltage.

Bad: the color of the EC light adjusting element was not changed 1 minute after the application of an electric voltage.

(3) Heat Shielding Properties Test

Each of the EC light adjusting elements of Examples and Comparative Examples was produced in the same manner as that described above without performing the bending of the mandrel with respect to the light transmitting electrically conductive film. The heat shielding properties at the time of the coloration of each of the EC light adjusting elements were measured. To be specific, an infrared lamp was applied to the EC light adjusting element at the time of the coloration, and heat passing through the EC light adjusting element was subjected to function evaluation by hand. At this time, a case where heat was not sensed was evaluated as "Good", a case where heat was slightly sensed was evaluated as "Poor", and a case where heat was clearly sensed was evaluated as "Bad". The results are shown in Table 1.

TABLE 1

| | Transparent Substrate | | Thickness | | | Light Transmitting Electrically Conductive Film | | | |
|---|---|---|---|---|---|---|---|---|---|
| | | | First Oxide Layer (T1) (nm) | Metal Layer (T3) (nm) | Second Oxide Layer (T2) (nm) | Presence or Absence of Contraction | Initial Surface Resistance Value R0 ($\Omega/\square$) | Bending Resistance | |
| | Material | Thickness (μm) | | | | | | R1/R0 | Limit Diameter (mm) |
| Ex. 1 | PET | 50 | 40 | 8 | 38 | Uncontraction | 10 | 1.01 | 4 |
| Ex. 2 | PET | 50 | 40 | 8 | 38 | Contraction | 9 | 1.00 | 2 |
| Ex. 3 | PET | 50 | 40 | 7 | 38 | Uncontraction | 12 | 1.01 | 4 |
| Ex. 4 | PET | 50 | 40 | 9 | 38 | Uncontraction | 8 | 1.02 | 4 |
| Ex. 5 | PET | 50 | 40 | 6 | 38 | Uncontraction | 10 | 1.01 | 4 |
| Ex. 6 | PET | 23 | 40 | 8 | 38 | Uncontraction | 10 | 1.01 | 4 |
| Ex. 7 | PET | 100 | 40 | 8 | 38 | Uncontraction | 10 | 1.02 | 4 |
| Ex. 8 | COP | 50 | 40 | 8 | 38 | Uncontraction | 10 | 1.01 | 4 |
| Ex. 9 | PC | 50 | 40 | 8 | 38 | Uncontraction | 10 | 1.01 | 4 |
| Comp. Ex. 1 | PET | 50 | 30 | — | — | Uncontraction | 150 | 1.01 | 5 |
| Comp. Ex. 2 | PET | 50 | 100 | — | — | Uncontraction | 45 | 1.18 | 10 |
| Comp. Ex. 3 | PET | 50 | 25 | — | — | Contraction | 90 | 1.15 | 8 |

| | Light Transmitting Electrically Conductive Film | | | EC Light Adjusting Element | | |
|---|---|---|---|---|---|---|
| | Visible Ray Transmittance (%) | Infrared Ray Average Transmittance (%) | Infrared Ray Average Reflectance (%) | Coloration Uniformity | Responsiveness | Heat Shielding Properties |
| Ex. 1 | 86 | 36 | 46 | Good | Good | Good |
| Ex. 2 | 86 | 36 | 46 | Good | Good | Good |
| Ex. 3 | 86 | 43 | 38 | Good | Good | Good |
| Ex. 4 | 84 | 30 | 54 | Good | Good | Good |
| Ex. 5 | 86 | 54 | 29 | Good | Good | Good |
| Ex. 6 | 86 | 36 | 46 | Good | Good | Good |

TABLE 1-continued

| | | | | | | |
|---|---|---|---|---|---|---|
| Ex. 7 | 86 | 36 | 46 | Poor | Good | Good |
| Ex. 8 | 86 | 36 | 46 | Good | Good | Good |
| Ex. 9 | 86 | 36 | 46 | Good | Good | Good |
| Comp. Ex. 1 | 84 | 88 | 9 | Good | Bad | Bad |
| Comp. Ex. 2 | 83 | 85 | 11 | Bad | Poor | Poor |
| Comp. Ex. 3 | 90 | 88 | 9 | Bad | Bad | Bad |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The electrochromic light adjusting member, the light transmitting electrically conductive film, and the electrochromic light adjusting element of the present invention can be applied in various industrial products, and can be, for example, preferably used for light adjusting devices such as light adjusting panel.

DESCRIPTION OF REFERENCE NUMERALS

1 Electrochromic light adjusting member
2 Transparent substrate
4 Light transmitting electrically conductive layer
5 Electrochromic light adjusting layer
6 First indium-based electrically conductive oxide layer
7 Metal layer
8 Second indium-based electrically conductive oxide layer
9 Light transmitting electrically conductive film
13 Electrochromic light adjusting element
15 Electrode substrate

The invention claimed is:

1. An electrochromic light adjusting member sequentially comprising: a
   transparent substrate, a light transmitting electrically conductive layer, and an electrochromic light adjusting layer,
   wherein the light transmitting electrically conductive layer sequentially includes a first indium-based electrically conductive oxide layer, a metal layer, and a second indium-based electrically conductive oxide layer, and both of the first indium-based electrically conductive oxide layer and the second indium-based electrically conductive oxide layer are an amorphous film,
   wherein the transparent substrate is a flexible film, and
   wherein the electrochromic light adjusting member is bendable.

2. The electrochromic light adjusting member according to claim 1, wherein
   a surface resistance value of the light transmitting electrically conductive layer is 50Ω/□ or less.

3. The electrochromic light adjusting member according to claim 1, wherein
   a near infrared ray average transmittance in 800 nm or more and 1500 nm or less of the light transmitting electrically conductive layer is 80% or less.

4. The electrochromic light adjusting member according to claim 1, wherein
   a near infrared ray average reflectance in 800 nm or more and 1500 nm or less of the light transmitting electrically conductive layer is 10% or more.

5. The electrochromic light adjusting member according to claim 1, wherein
   the light transmitting electrically conductive layer has a ratio ($R_1/R_0$) of a surface resistance value $R_1$ after bending thereof to an initial surface resistance value $R_0$ of 1.05 or less.

6. An electrochromic light adjusting element comprising:
   the electrochromic light adjusting member according to claim 1 and
   an electrode substrate provided on the surface opposite to an electrochromic light adjusting layer with respect to the transparent substrate.

7. A light transmitting electrically conductive film for being used in the electrochromic light adjusting member sequentially comprising: a transparent substrate and a light transmitting electrically conductive layer, wherein the light transmitting electrically conductive layer sequentially includes, from the transparent substrate, a first indium-based electrically conductive oxide layer, a metal layer, and a second indium-based electrically conductive oxide layer, and both of the first indium-based electrically conductive oxide layer and the second indium-based electrically conductive oxide layer are an amorphous film,
   wherein the transparent substrate is a flexible film, and
   wherein the light transmitting electrically conductive film is bendable.

\* \* \* \* \*